United States Patent
Statton et al.

(10) Patent No.: US 12,348,834 B1
(45) Date of Patent: Jul. 1, 2025

(54) CONTENT DELIVERY USING CLIENT-SIDE SECONDARY EVENT DATA INSTRUCTIONS

(71) Applicant: Amazon Technologies, Inc., Seattle, WA (US)

(72) Inventors: Evan Statton, Denver, CO (US); Margo Haney McDowall, Portland, OR (US); Nicolas Weil, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/809,866

(22) Filed: Jun. 29, 2022

(51) Int. Cl.
| | |
|---|---|
| *H04N 21/6332* | (2011.01) |
| *H04N 21/43* | (2011.01) |
| *H04N 21/437* | (2011.01) |
| *H04N 21/44* | (2011.01) |
| *H04N 21/845* | (2011.01) |

(52) U.S. Cl.
CPC ..... *H04N 21/6332* (2013.01); *H04N 21/4302* (2013.01); *H04N 21/437* (2013.01); *H04N 21/44* (2013.01); *H04N 21/8456* (2013.01)

(58) Field of Classification Search
CPC .......... H04N 21/6332; H04N 21/4302; H04N 21/437; H04N 21/44; H04N 21/8456
See application file for complete search history.

(56) References Cited

U.S. PATENT DOCUMENTS

| | | | | |
|---|---|---|---|---|
| 2013/0305278 | A1* | 11/2013 | Gordon | H04N 21/2665 725/32 |
| 2015/0032900 | A1* | 1/2015 | Shanson | H04N 21/2387 709/231 |
| 2016/0269771 | A1* | 9/2016 | Bangma | H04N 21/4126 |
| 2017/0359628 | A1* | 12/2017 | Sachdev | H04N 21/44016 |
| 2019/0132627 | A1* | 5/2019 | Loheide | H04N 21/2668 |
| 2023/0014831 | A1* | 1/2023 | Marten | H04N 21/8456 |
| 2023/0124561 | A1* | 4/2023 | Maggiore | G06V 20/41 725/28 |

* cited by examiner

*Primary Examiner* — Sumaiya A Chowdhury
(74) *Attorney, Agent, or Firm* — Knobbe, Martens, Olson & Bear, LLP

(57) ABSTRACT

Systems and methods for client-side processing of secondary event data are provided. Client computing device receive and process manifest information provided by a streaming content service in response to a content request. In addition to the identification of the set of encoded content segments, the returned manifest information includes the secondary event instructions that instruct the client computing device on how to further process received encoded content segments with secondary event data. The client computing device may process the secondary event instructions to identify what graphics and audio codes need to be inserted be include; timing information regarding when graphics or codes are needed to be inserted; location or placement information regarding how these graphics or codes are inserted when rendered by the client computing device.

23 Claims, 8 Drawing Sheets

CONTENT DELIVERY USING CLIENT-SIDE SECONDARY EVENT DATA INSTRUCTIONS

BACKGROUND

Generally described, computing devices and communication networks can be utilized to exchange data or information. In a common application, a computing device can request content from another computing device via the communication network. For example, a client having access to a computing device can utilize a software application to request content from a server computing device via the network (e.g., the Internet). In such embodiments, the client's computing device can be referred to as a client computing device, and the server computing device can be referred to as an original content provider.

The original content provider may provide content to a client, where the client can be provided via a streaming channel. The content, for example, can include any media content, such as video, audio, image, and the like, provided by the original content provider. In some embodiments, prior to transmission, the primary content that will be streamed for display is further processed with additional content, such as image data, audio data, etc. The additional content may be generally referred to as supplemental content, secondary event content, or secondary events. For example, the processing of secondary event data can include inserting or blending branding graphics, such as a news ticker at the bottom of a screen, a graphic overlay for advertisements, networks' logos, etc. This process can be referred to as "channel branding," which can be dynamic in nature such that the secondary event data included with original content can vary. In some embodiments, a service provider may provide resources (i.e., network computing device resources such as CPUs, GPUs, or servers) to perform the channel branding. The service provider can be referred to as a streaming service provider or any service provider that can utilize its resources to perform the channel branding.

The service provider can provide its network computing device resources, such as CPUs, GPUs, or servers, that are configurable to execute tasks for processing content provided by the original content provider. Specifically, the service provider can encode content to be provided to requesting client devices as a set of encoded content segments transmitted in accordance with a streaming protocol. In some embodiments, the service provider performs secondary event data processing to obtain, process, and render the secondary event data with the original content requested from the client for the purpose of including the secondary event data with the set of encoded content segments provided to the client devices. For example, the service provider can process original content by inserting the secondary content into the original content and synchronizing the original content after the processing. The processing can be based on the secondary event instructions. Such synchronization can further include some form of criteria in terms of the secondary content that is selected, such as customized content or how the selected secondary content is presented with the encoded content. In accordance with traditional streaming protocols, the set of encoded content segments including the combination of the original content and secondary event data, is identified in a manifest that is transmitted to client devices. In response, the client computing devices simply transmit individual requests for the encoded content segments (including the secondary content) based on the identification of the set of encoded content segments in the manifest.

In these embodiments, the service provider executes the instructions with consideration of efficiency in using the network-based computing device resources and the cost associated with the resource usage. For example, for larger scale implementations, a service provider may receive a high volume of requests for original content, such as popular television shows or sports programs, that may require a higher degree of unique processing of different secondary event data, such as region-based secondary event data. Such server-side processing of the generation of the encoded content segments, including secondary event data, can increase the strain on the service provider's computing resources.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
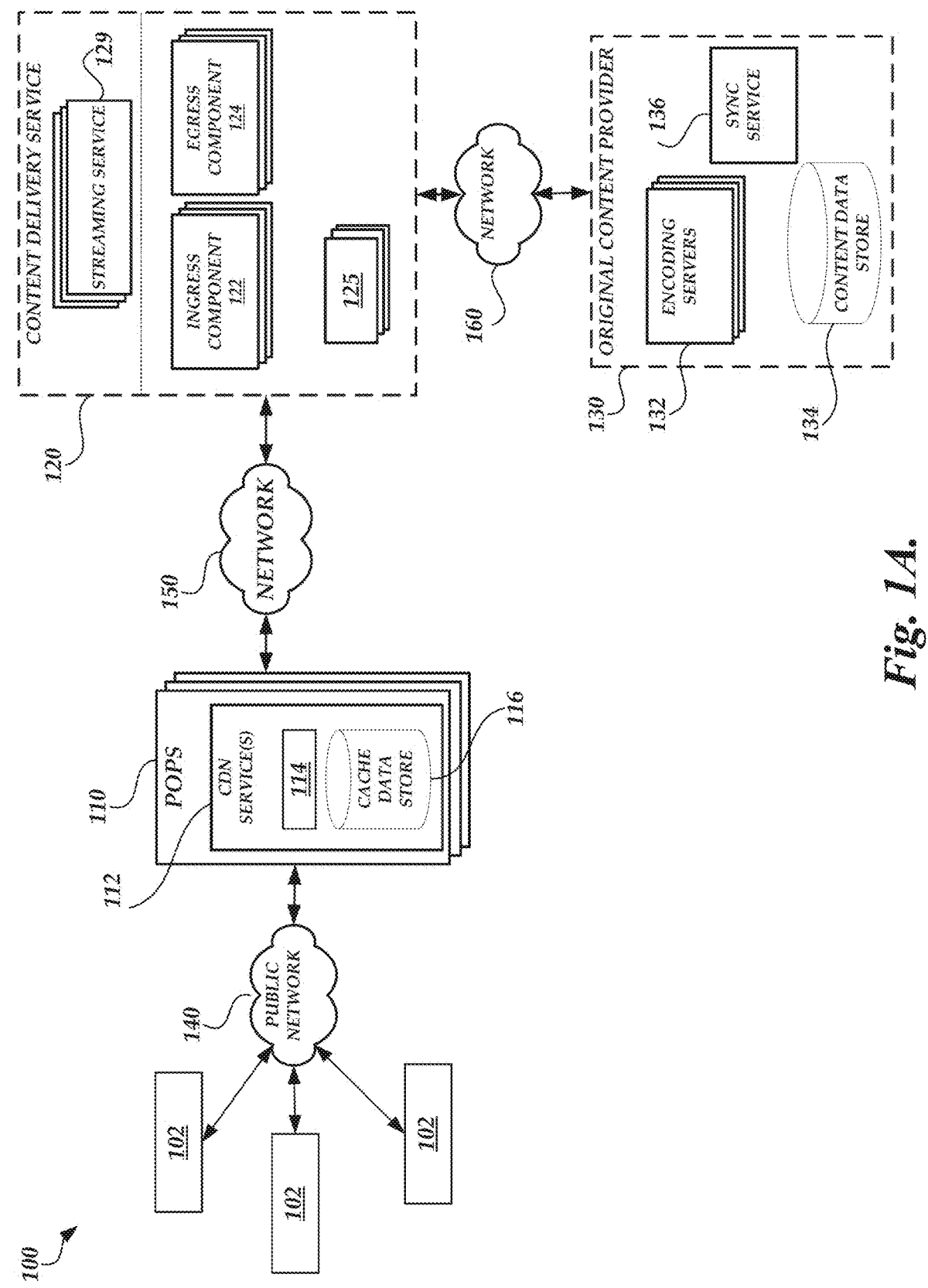
FIG. 1A is a block diagram of a content delivery environment that includes one or more client computing devices, a content delivery service, and an original content provider according to one embodiment.

Aspects of the present disclosure relate to systems and methods for client-side processing of secondary event data. More specifically, aspects of the present application related to client-side processing of secondary event data in content-streaming applications. Illustratively, a content streaming service can receive original content from a content service provider(s), which can be processed in various bitrate/format combinations for transmission to client computing devices in accordance with a streaming protocol. The result can be one or more sets of encoded content segments corresponding to the original content received by the content streaming service. Under traditional streaming approaches, prior to generating the set of encoded content segments, the content streaming service would require further processing the original content to select and include secondary event data that would be encoded with the original content.

Illustratively, in accordance with aspects of the present application, without requiring the service provider's resources such as CPUs, GPUs, and servers, where secondary event data can be included with encoded content segments based on client-side processing of the secondary event data. For example, the client-side processing can include but is not limited to inserting various types of graphics and/or audio code based on pre-defined rules such as pre-defined specific time slots for associated graphics or audio codes, specific positions on a screen to overlay graphics, graphical animation effects, etc. In this example, the client-side computing device may process the encoded content segments by inserting the secondary event data based on the secondary event instructions provided to the client-side to perform the synchronization. In other examples, the secondary event data includes graphical representation information, audio manipulation information, or various types of animation such as "snipes," "squeeze in," "fly-in and out," etc. The graphical representation information may include various types of graphics and their time slots where one or more graphics are inserted and screen position associated with each graphic's overlay. The audio manipulation information may include audio watermarks such as a Nielsen watermark, including a Nielsen code. In addition, the secondary event instructions may provide the source of the graphical images, audio codes, and a list of animations that the client can select. For example, the instructions may provide a uniform resource locator (URL) or a library address (server address) associated with each of the graphical images and audio watermarks, and the client may select a graphic and insert it into the contents by using an animation provided in the instruction.

One aspect of the present disclosure is related to providing encoded content manifest data corresponding to a streaming protocol that includes additional instructions (i.e., hints) to an application to obtain or identify secondary event data to be rendered with the encoded content segments also identified in the manifest. Illustratively, after receiving a request from a client, a streaming service or content provider may provide a manifest identifying a set of encoded content segments that will be requested and rendered by the client computing device. As discussed above, in one embodiment, the streaming service or content provider does not blend or insert the secondary event data as part of the preparation of the encoded content segments that are requested and provided to the client computing device. Rather, the manifest information further includes secondary event data processing instructions that provide information related to the identification of secondary event data. The secondary event data processing instructions can be referred to as secondary event instructions.

Illustratively, original content provider(s) may upload original content and the secondary event instructions to the content streaming service. In response to receiving the original contents and secondary event instructions, the content streaming service may process the instructions to generate secondary event instructions that are included in the manifest data associated with the streaming protocol used to stream requested content to client computing devices.

Illustratively, the content streaming service indexes the set of encoded content segments (either live streaming or file-based video-on-demand) and processes it for delivery to clients via a wide range of communication protocols such as HTTP Live Streaming ("HLS"), Dynamic Adaptive Streaming over HTTP ("DASH"), HTTP Dynamic Streaming ("HDS"), Real-Time Messaging Protocol ("RTMP"), Smooth Streaming, and the like. In addition, the content delivery service identifies content instructions and processes the instructions to include it in the associated communication protocol as manifest data. Based on consumer demand, a content delivery service can also provide advanced video transmission features such as just-in-time packaging of video content, digital rights management ("DRM") encryption, time-shifting, bitrate selection, catch-up TV, and more.

As described above, traditional secondary event data processing for a content streaming service is performed by a network-based computing device such as a streaming service provider (i.e., network computing device resources such as CPUs, GPUs, or servers). More specifically, the streaming service provider may insert a graphical representation or audio watermark or codes into the original content. The process of inserting the secondary event data into the original content can be referred to as channel branding. After inserting the secondary event data into the original content, the original content is encoded into encoded content segments. Thereafter, the encoded content segments can be provided to the client, and the client can provide a streaming service to its viewers.

In some embodiments, when the streaming service provider (i.e., network computing device resources such as CPUs, GPUs, or servers) receives a high volume request to perform the channel branding, a strain on the streaming service provider's resources can be caused. The strain on the streaming service provider's resources also can cause a delay or cost in maintaining the streaming service provider's resources. For example, when there is a high volume of content that is needed to be inserted with branding graphics or audio watermark, the streaming service provider's resources, such as the CPU or GPU, have to run for a long period of time, and the number of resources has to be increased based on the volume of the contents.

In some embodiments, the content streaming service may be required to generate a plurality of sets of encoded segments based on a common original content to account for different secondary event data or display characteristics of secondary event data. For example, a content streaming service may provide a content streaming service to client devices in multiple geographic or logical regions. Individual regions may be associated with different types of secondary event data, such as graphics and audio watermarks or pre-defined rules for how the secondary event data is to be presented with the original content. In this example, the traditional content streaming service (i.e., network computing device resources such as CPUs, GPUs, or servers) would be required to perform channel branding on the original content multiple times to generate a unique set of encoded content segments based on differences in secondary event data selection or presentation. For example, if there are 50 groups of viewers, where each group of viewers is required to have different branding graphics, the network service provider has to perform the channel branding 50 times for each group of viewers. In such an example, 50 streaming contents need to be encoded, where each streaming content includes the branding graphics or audio watermarks associated with each viewer group.

To address at least a portion of the above-described deficiencies, one or more aspects of the present disclosure correspond to systems and methods for utilizing client computing devices to perform the processing of secondary event data based on secondary event instructions included in manifest information provided by the streaming content service. More specifically, aspects of the present disclosure correspond to the utilization of a client computing device that processes manifest information provided by a streaming content service in response to a content request. In addition to the identification of the set of encoded content segments, the returned manifest information includes the secondary event instructions that instruct the client computing device on how to further process received encoded content segments with secondary event data. For example, illustratively, the client computing device may process the secondary event instructions to identify what graphics and audio codes need to be inserted be include; timing information regarding when graphics or codes are needed to be inserted; location or placement information regarding how these graphics or codes are inserted when rendered by the client computing device; and the like.

In some embodiments, it may be possible for the client computing device to modify or personalize the secondary event data, such as graphical and audio information that is inserted during channel branding. The personalization can be based on a characteristic of its viewers and to provide a customized streaming service to an associated region or viewers. In such embodiments, the client computing device may download the encoded content segments and utilize customization information or preferences that may be allowed or specified in the secondary event instructions. Illustratively, the client computing device receives encoded content segments from a content delivery network (CDN) and creates various channels by inserting customized (or personalized) graphics or audio watermarks based on the characteristic of its viewers. For example, a client may request a FIFA soccer match streaming service to both countries associated with each national team, and the client may insert specific graphics associated with each national team in streaming to the regions.

In some embodiments, it may also be possible for the client computing device to receive the secondary event instructions from one or more external sources. The client computing device may also modify or personalize the secondary event instructions.

This personalization aspect of the instructions processing component is advantageous because the content streaming service can provide personalized channel branding (e.g., use of secondary event data) without the requirement of re-encoding the original content based solely on the secondary event data that is to be included. For example, conventionally, the graphics or audio code are inserted (i.e., channel branding) into the original video content before the encoding, and then, the original video content, including the graphics and audio codes, are encoded into the video segments and stored into servers as "mezzanine" (or "master") assets. Thus, conventionally, to personalize the encoded video segments, personalized graphic and audio codes are needed to be inserted into the original video. The original video needs to be re-encoded with the personalized graphic and audio code. In contrast, the embodiments of the present disclosure provide that the client computing device 102 downloads the encoded content segments and then inserts the graphics or audio code. Therefore, the client can personalize the graphics and audio code and insert the personalized graphics and audio code into the encoded video segments without re-encoding the original video again.

In some embodiments, the client computing device is configured to execute one or more client instructions to create linear over-the-top (OTT) channels with existing contents. In these embodiments, a service provider (i.e., streaming service provider) may provide the existing contents stored in a library, such as an on-demand library. In one embodiment, the service provider may receive queries from the client and recommend the contents related to the client's query. The client may also schedule the sequence of the content to be played in a content streaming channel. For example, suppose a client is planning to create OTT channels related to a baseball game played on a specific day. In that case, the client may input a query requesting the related video content. The service provider may recommend the video content related to the query by searching the library in response to the query.

Although aspects of the present disclosure will be described with regard to illustrative network components, interactions, and routines, one skilled in the relevant art will appreciate that one or more aspects of the present disclosure may be implemented in accordance with various environments, system architectures, external computing device architectures, and the like. Similarly, references to specific devices, such as a client computing device, can be considered to be general references and not intended to provide additional meaning or configurations for individual external computing devices. Additionally, the examples are intended to be illustrative in nature and should not be construed as limiting.

FIG. 1A illustrates a general content delivery environment 100 for delivering content from original content providers to client computing devices. The content delivery environment 100 includes a plurality of client computing devices 102 utilized by individual clients, generally referred to as client computing devices, to request streaming or download content from a content delivery service 120. Illustratively, the content delivery service 120 can correspond to one or more services utilized in the transmission of the encoded content to the client computing device 102. The content delivery service 120 can include a video packaging and origination service that indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Smooth Streaming, Real Time Messaging Protocol ("RTMP"), and the like. Based on consumer demand, a content delivery service can also provide advanced video transmission features such as just-in-time packaging of video content, digital rights management ("DRM") encryption, time-shifting, bitrate selection, catch-up TV, and more. In addition, the content delivery service 120 may include manifest data. The content delivery service 120 can receive the manifest data with the original contents, and the manifest data may include secondary event instructions that provide instructions to insert the secondary event data into the original content. The manifest data also may include other information, such as the information about various bitrates or resolutions available for streaming the content. The content can be illustratively provided by one or more origin sources, such as original content provider 130.

Client computing devices 102 may include any number of different computing devices capable of communicating with the networks 140, 150, 160, via a direct connection or via an intermediary. For example, individuals accessing computing devices may correspond to laptops or tablets, personal computers, wearable computers, servers, and the like. Each client computing device 102 may include one or more data processors such as CPU and GPU to execute and process instructions used to execute the embodiments disclosed herein. For example, each client computing device 102 can process the original content by inserting the secondary event data based on the secondary event instructions. In addition, the client computing device 102 can execute one or more client instructions to create linear over-the-top (OTT) channels with one or more existing contents.

In some embodiments, the client computing device 102 is configured to process the original content by inserting one or more of the secondary event data. The secondary event data, for example, includes images, videos, audio codes, animations, texts, etc. The secondary event instructions may provide the client with which one of the secondary event data is needed to be inserted into the original content; when these secondary event datas are needed to be inserted; where these secondary event datas are needed to be inserted within the original content segments; how the client can download or receive the secondary event data; and what kinds of animation should be used. In these embodiments, the secondary event instructions may provide sources of secondary event data to enable the client to download or obtain the content accordingly. For example, a client using the client computing device 102 may download a graphic or audio code by accessing the provided sources, such as uniform resource locator (URL) addresses or one or more library addresses (server address) associated with each of the graphical images and audio code. The secondary event instructions also may provide pre-defined rules, such as specific time slots or events in the original content, where one or more graphics or audio codes are inserted to each of the time slots or events. For example, the time slot can be defined between two sequential segments in a video file, where the video file is encoded into content segments. In this example, the video file is transmitted to the client computing device 102 in the segment by segment, and each segment typically accounts for 2-10 seconds of playtime. In addition, where the client computing device receives a live streaming video, the pre-defined rule may provide specific events, where each event is associated with a specific graphic or audio code. For example, when the client computing device 102 is receiving a soccer game in a live streaming service, the pre-defined rules may provide that when the first half of the game is finished (such as that the referee is blowing the whistle to indicate the end of the first half of the game), a specific graphic is inserted into the live streaming channel. These are provided merely as examples, and the embodiments disclosed herein are not limited to these examples.

In some embodiments, a content delivery network (CDN) service provider 110 may include multiple edge locations from which a client computing device can retrieve content. Individual edge location 112 may be referred to herein as a point of presence ("POP"), where a POP is intended to refer to any collection of related computing devices utilized to implement functionality on behalf of one or many providers. POPs are generally associated with a specific geographic location in which the computing devices implementing the POP are located or with a region serviced by the POP. As illustrated in FIG. 1, the POP 110 can include one or more metric information processing components 114 for processing metric information provided by client computing devices 102 and a data store 116 for maintaining collected metric information. For example, a data center or a collection of computing devices within a data center may form a POP. In some instances, the POPs may implement one or more services, such as CDN, data storage, and data processing. The CDN service provider 110 may include multiple POPs located in different geographic locations so that client computing devices can communicate with a nearby a POP to retrieve content, thereby reducing the latency of delivering requested content.

Networks 140, 150, 160 may be any wired network, wireless network, or combination thereof. In addition, the networks 140, 150, 160 may be a personal area network, local area network, wide area network, cable network, fiber network, satellite network, cellular telephone network, data network, or combination thereof. In the example environment of FIG. 1, network 140 is a global area network (GAN), such as the Internet. Protocols and components for communicating via the other aforementioned types of communication networks are well known to those skilled in the art of computer communications and, thus, need not be described in more detail herein. Accordingly, communication times and capabilities may vary between the components of FIG. 1.

A content delivery service 120 may include one or more servers for receiving content from original content providers 130 and processing the content to make available a set of received encoded bitrate segments, such as via a video packaging and origination service. In addition, the components of the content delivery service 120 may provide the encoded content to separate stand-alone services, such as content delivery service, for subsequent transmission to client computing devices 102 or a CDN service 110. In other embodiments, the illustrated components of the content delivery service 120 may be integrated or form a part of a content delivery service environment. Accordingly, the term content delivery service 120 may be generally variable and is not limited to any particular implementation.

The content delivery service 120 may include one or more ingress components 122 (e.g., "decoders" or "decoding nodes") utilized to receive encoded data streams from encoding servers 132 from original content providers 130. Illustratively, the ingress components 122 can process the incoming encoded content from the original content providers 130. The content delivery service 120 also includes one or more egress components 124 (e.g., "encoders" or "encoding nodes") encoding decoded content into a bitrate and format for delivery to client computing devices. The ingress components 122 and egress components 124 may be distributed according to geographic criteria or availability zones to facilitate delivery or access to encoded content. Additionally, although the ingress components 122 and egress components 124 are illustrated as separate components, in some embodiments, one or more computing devices 102 may be configured to implement the functionality associated with both the ingress components 122 and egress components 124. An illustrative configuration of ingress components 122 (decoding nodes) and egress components 124 (encoding nodes) will be illustrated in greater detail with regard to FIG. 1B.

The content delivery service 120 also includes a plurality of content streaming service 129 corresponding to a content delivery component for establishing individual communication channels with the client computing device 102. Each streaming service 129 can correspond to an individual client computing device 102, groupings of client computing devices 102 (e.g., by household or region), or combinations thereof. Illustratively, in one embodiment, the content streaming service 129 can correspond to a separate service that is independent of a different service incorporating the ingress components 122 and egress components 124.

The content streaming service 129 can further identify instructions received from the original content provider 130 and process the identified instructions to include the instructions in manifest data associated with the communication protocol. For example, various communication protocols such as HTTP Live Streaming ("HLS"), Dynamic Adaptive Streaming over HTTP ("DASH"), HTTP Dynamic Streaming ("HDS"), Smooth Streaming, Real Time Messaging Protocol ("RTMP"), and the like can be used, and the form of the manifest data is determined based on one of the communication protocol used in the content streaming service 129. In some embodiments, the instructions are transmitted from the original content provider 130.

It will be appreciated by those skilled in the art that the content delivery service 120 may have fewer or greater components than are illustrated in FIG. 1A. Thus, the depiction of the content delivery service 120 in FIG. 1A should be taken as illustrative. For example, in some embodiments, components of the content delivery service 120 may be executed by one more virtual machine implemented in a hosted computing environment. A hosted computing environment may include one or more rapidly provisioned and released computing resources, which computing resources may include computing, networking, or storage devices. Accordingly, while such components are illustrated as logically being logically grouped in FIG. 1, one skilled in the relevant art will appreciate that one or more aspects of the present disclosure can include the content delivery service 120 as being implemented in multiple geographic areas. Additionally, not all geographic regions hosting portions of the content delivery service 120 will necessarily have all the same components or a combination of components. Accordingly, the illustrated relationship in FIG. 1A is only logical in nature.

With continued reference to FIG. 1A, the content delivery environment 100 also includes original content providers 130. Illustratively, the original content provider can include a plurality of encoders 132 for generating multiple encoded streams for transmission to the content delivery service 120. In some embodiments, the original content provider 130 may include the instructions associated with original contents and provide the instructions with the associated original contents to the content delivery service 120. In one embodiment, individual encoders may generate different encoded versions of a content segment according to a different encoding profile. The original content provider 130 can also include logic or other management components for determining how many encoders 132 should be utilized or how to manage the addition or removal of encoders. In some embodiments, the original content provider 130 can further include synchronization services 136 for generating synchronization information utilized by the encoders, such as sequence numbers corresponding to the set of encoded segments, time stamp information related to a relative time of the encoded segments or from which relative time of encoded segments will be based, and the like.

Figure 1B:
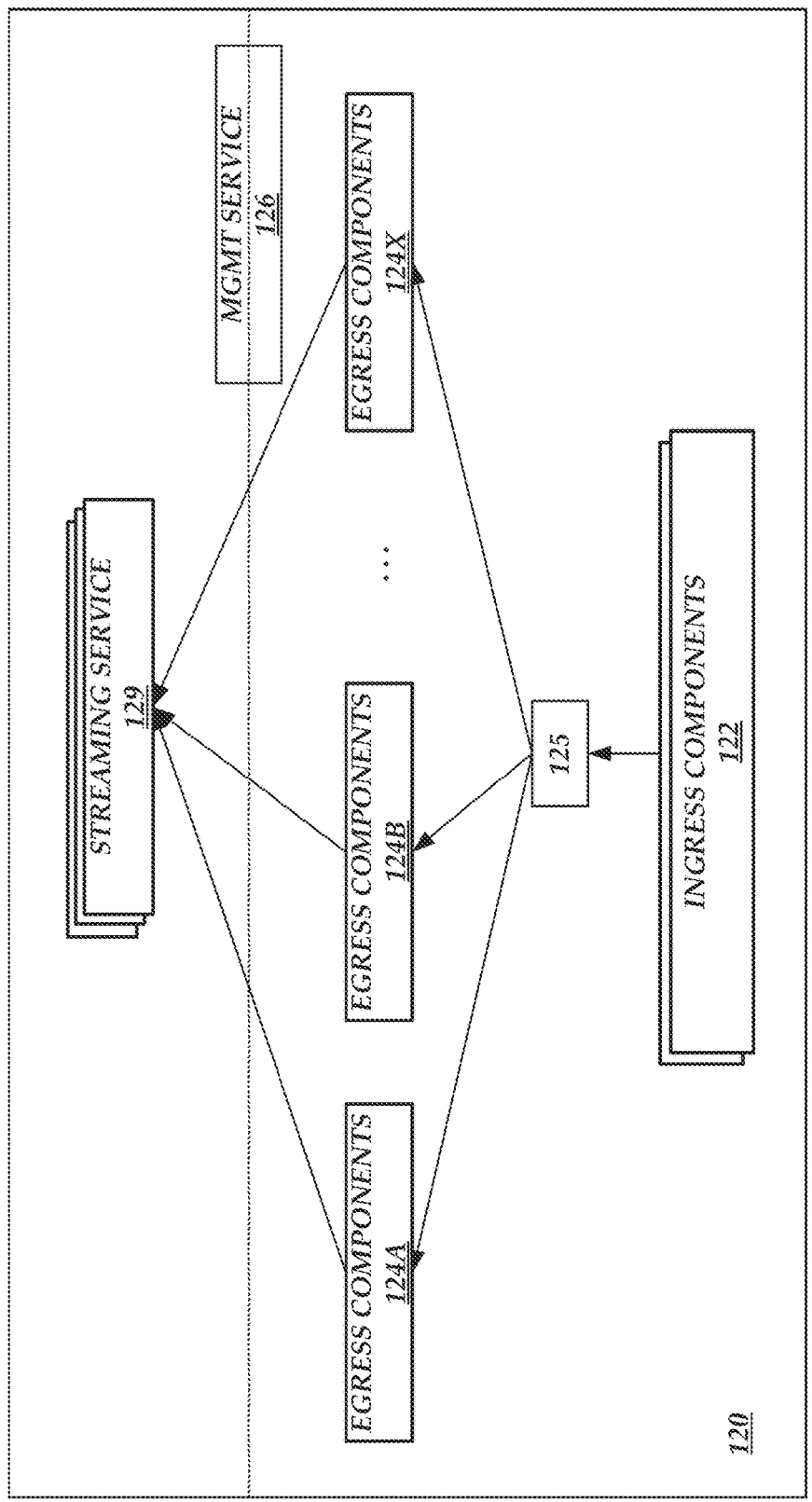
FIG. 1B is a block diagram of the content delivery service of FIG. 1A illustrating components of a content delivery service in accordance with an illustrative embodiment.

With reference now to FIG. 1B, an illustrative arrangement of ingress components 122 (decoding nodes), cache servers 125, egress components 124 (encoding nodes), and content streaming service 129 will be described. As illustrated in FIG. 1B, one or more ingress components (decoding nodes) can receive (directly or indirectly) original content from original content providers 130. In some embodiments, the original content is encoded in a bitrate/format representing a higher (or highest) quality that will eventually be transmitted to requesting users by the content delivery service 120. The decoding nodes 122 will decode the content and store the unencoded nodes in a memory, such as a cache 125 that is accessible to one or more encoding nodes 124. In a streaming embodiment, the decoding node continuously receives, decodes, and stores the original content. Additionally, the decoding nodes 122 can process multiple content streams from the same or different original content providers 130.

Once unencoded content is available at the cache 125 (or other memory), one or more encoding nodes 124 will access the unencoded content and begin generating encoded content. Individual encoding nodes can be configured to encode content according to different encoding bitrate/format combinations. In other embodiments, multiple encoding nodes 124A, 124B . . . 124X may be configured to encode the same content according to the same encoding bitrate/format combination to represent redundant or duplicative encoded content streams. In other embodiments, the encoding nodes 124A, 124B 124X may access different unencoded content such that there is no overlap, commonality, or overlap in the generated encoded content.

Figure 2:
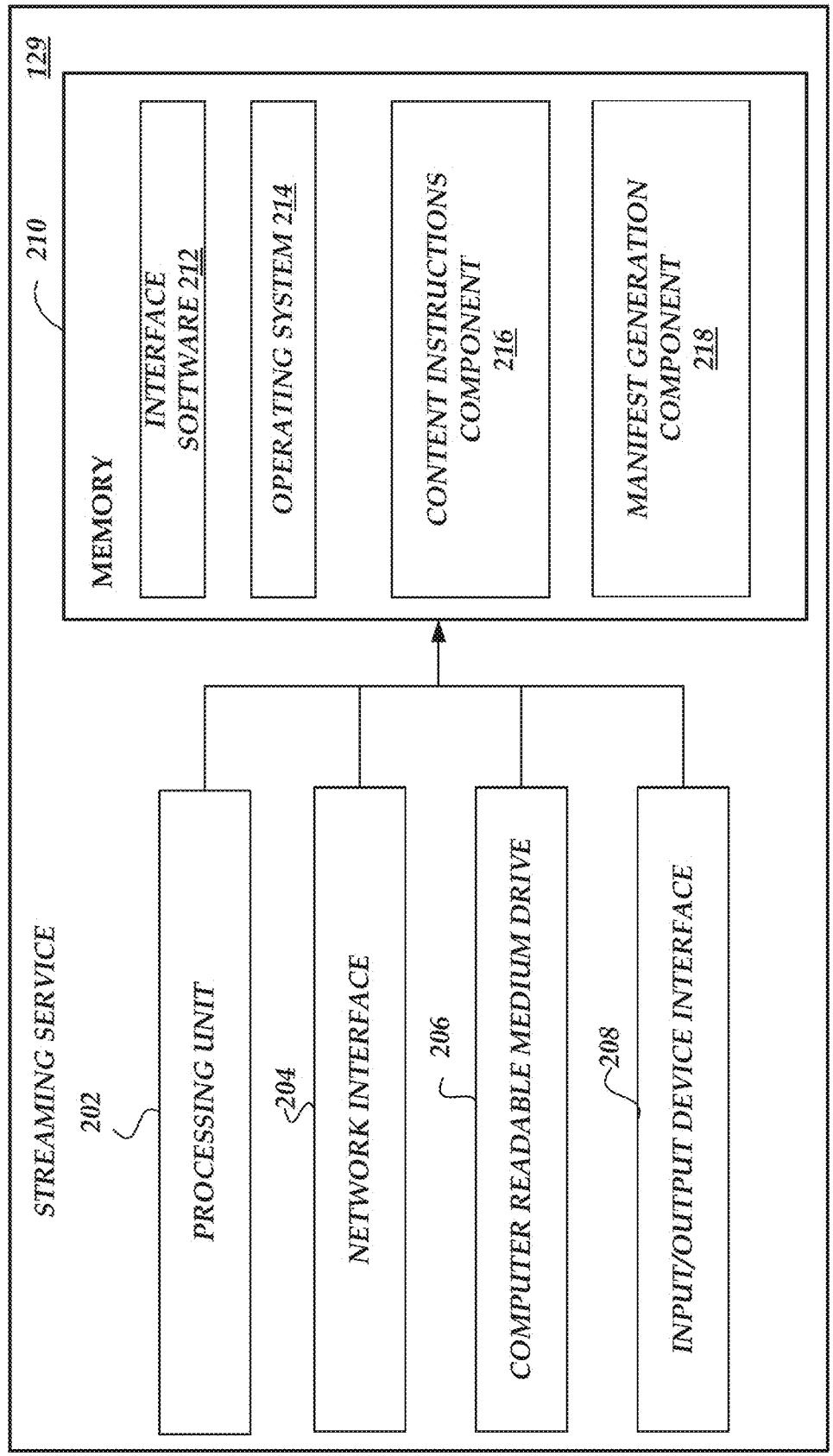
FIG. 2 is a block diagram of illustrative components of a streaming service configured to generate manifest data with instructions and establish communication channels with the client computing device.

FIG. 2 depicts one embodiment of an architecture of an illustrative streaming service 129 for generating manifest with instructions and establishing communication channels with the client computing device 102. In some embodiments, the streaming service 129 receives encoded original content segments from the original content provider in FIG. 1A. The streaming service 129 may process the incoming stream of encoded content segments or original encoded content and transmit it to the CDN, where the client can download the encoded content segments. The general architecture of the streaming service 129 depicted in FIG. 2 includes an arrangement of computer hardware and software components that may be used to implement aspects of the present disclosure. As illustrated, the streaming service 129 includes a processing unit 202, a network interface 204, a computer-readable medium drive 206, and an input/output device interface 208, all of which may communicate with one another by way of a communication bus. The components of the streaming service 129 may be physical hardware components or implemented in a virtualized environment.

The network interface 204 may provide connectivity to one or more networks or computing systems, such as the network 150 or network 160 of FIG. 1A. The processing unit 202 may thus receive information and instructions from other computing systems or services via a network. The processing unit 202 may also communicate to and from memory 210 and further provide output information for an optional display via the input/output device interface 208. In some embodiments, the streaming service 129 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 202 in the general administration and operation of the content delivery service 120. The memory 210 may further include computer program instructions and other information for implementing aspects of the present disclosure. For example, in one embodiment, the memory 210 includes interface software 212 for receiving and processing content for the content delivery service 120.

Additionally, the memory 210 includes content instructions component 216 for processing secondary event instructions received from the original content provider 130 of FIG. 1A. In some embodiments, the content instructions component 216 receives the secondary event instructions from external sources. The content instructions component 216 may identify one or more received secondary event instructions and their associated original content. In some embodiments, the original content provider 130 of FIG. 1A transmits the original content segments with the secondary event instructions and the content delivery service 120 of FIG. 1A receives the instructions. In one embodiment, the instruction is provided as a file included in the original content segment. The instructions also may be received as a separate file from the original content segments. In one embodiment, the instructions are received from one or more external sources via the network interface 204 and/or the input/output device interface 208. In one embodiment, one or more secondary event datas, such as graphics or audio files that can be used with the instructions, can be sent from the original content provider. The secondary event data can be sent as a part of the original content segments or a separate file or data from the original content segments. The secondary event instructions can be related to the process of the original content and the secondary event data, where a client performs the process following the instructions using the client computing device. The instructions may provide the client with which one of the secondary event data are needed to be inserted in the original content; when these graphics or codes are needed to be inserted; where these graphics or codes are needed to be inserted; how the client can download or receive the graphics and audio watermarks; and what kinds of animation should be used. In another embodiment, one or more secondary event datas can be sent from one or more external sources via the network interface 204 and/or the input/output device interface 208.

The memory 210 may further include a manifest generation component 218 to process the secondary event instructions to be included in manifest data. In some embodiments, the manifest generation component 218 may identify a communication protocol used in delivering the encoded original content segments. The communication protocol may include, for example, HLS, DASH, HDS, RTMP, and RTMP. These protocols are provided merely as examples, and other types of protocols can be used. After identifying the communication protocol used in delivering the content segments, the manifest generation component 218 may generate manifest data based on the identified communication protocol and overwrite the instructions into the manifest data. For example, in determining that the HLS streaming communication protocol is used to deliver the original content segments, the manifest generation component 218 may generate a HLS manifest data and write the instructions on the manifest data. In one embodiment, where there is an existing manifest data, the manifest generation component 218 may add the instructions on the existing manifest data.

Figure 3:
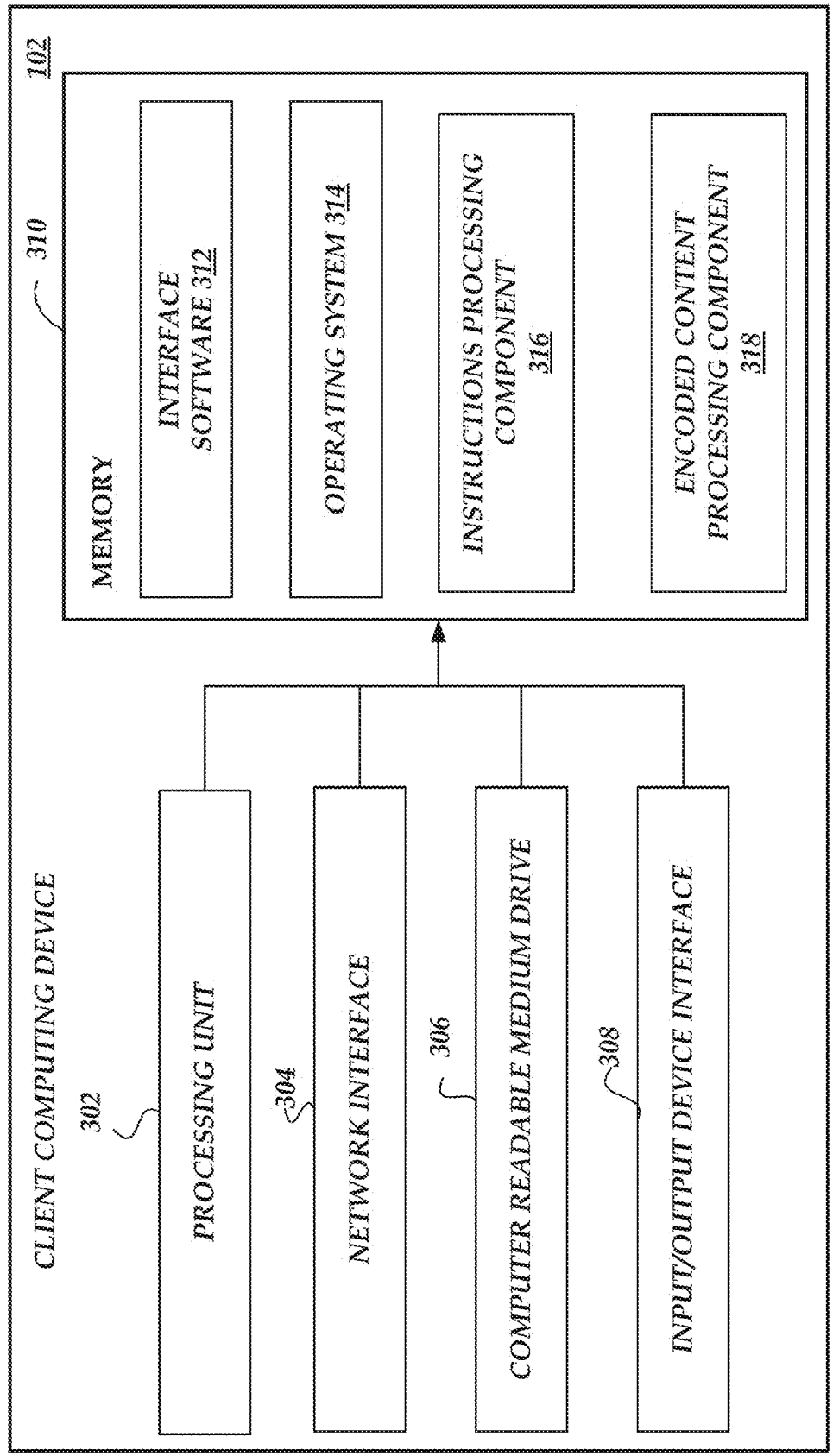
FIG. 3 is a block diagram of illustrative components of client computing device configured to process to insert secondary event data into an original content based on secondary event instructions in manifest data.

FIG. 3 depicts one embodiment of an architecture of an illustrative client computing device 102 for performing the process of inserting the secondary content into the original content. In some embodiments, the secondary event instructions are provided to the client computing device to render the client to perform the process. In some embodiments, the client computing device 102 requests a CDN service 114 to download encoded content segments, whereas the CDN service 114 stores encoded video segments received from the streaming service 129 in the content delivery service 129. The encoded video segments can be provided as video on demand (VOD) streaming or live streaming. In some embodiments, the client computing device 102 may receive manifest data that includes the secondary event instructions. For example, the CDN service 114 transmits manifest data regarding the encoded video segments. The manifest data may include the secondary event instructions and various bitrates or resolutions that can be used for streaming the encoded video segments. In one embodiment, the client computing device 102 receives secondary event data from the CDN service, where the supplement contents can be used in channel branding. The general architecture of the client computing device is depicted in FIG. 3 includes an arrangement of computer hardware and software components that may be used to implement aspects of the present disclosure.

As illustrated, the client computing device 102 includes a processing unit 302, a network interface 304, a computer readable medium drive 306, and input/output device interface 308, all of which may communicate with one another by way of a communication bus.

In some embodiments, it is also possible that the client computing device 102 receives the secondary event data and/or the secondary event instructions from one or more external sources. It may also be possible for the client computing device to modify (i.e., personalize) the secondary event instructions and the secondary event data based on a characteristic of its viewers and to provide a customized streaming service to an associated region or viewers.

The network interface 304 may provide connectivity to one or more networks or computing systems, such as the network 150 or network 160 of FIG. 1A. The processing unit 302 may thus receive information and instructions from other computing systems or services via a network. The processing unit 302 may also communicate to and from memory 310 and further provide output information for an optional display via the input/output device interface 308. In some embodiments, the client computing device 102 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 302 in the general administration and operation of the content delivery service 120. The memory 310 may further include computer program instructions and other information for implementing aspects of the present disclosure. For example, in one embodiment, the memory 310 includes interface software 312 for receiving and processing content for the content delivery service 120.

Additionally, the memory 310 includes an instructions processing component 316 for processing the second event instructions included in the manifest data. In some embodiments, the instructions provide what graphics and audio codes can be inserted in a channel. In these embodiments, the instructions include a list of graphics and audio codes and their sources, such as uniform resource locator (URL) addresses or one or more library addresses (server addresses) associated with each graphical image and audio code. For example, the instructions provide a graphic of a "news ticker" and the URL address to download the "news ticker." In another example, the instructions provide various Nielsen codes, where each Nielsen code can be used in a specific region. In such an example, the client may download the Nielsen code associated with a specific region where the client plans to provide the video streaming service. In some embodiments, the instructions include a pre-defined rule, such as time slots or events associated with graphic or audio code. For example, each segment of the encoded video segments may have a playtime of 10 seconds. In this example, if the total playtime of the encoded video segments is 1 hour, there are 360 time slots. In one embodiment, where the client is providing a live streaming service using the encoded video segments, the pre-defined rules may provide events where each event is associated with a specific graphic or audio code. For example, suppose the encoded video is a live baseball game provided in a live streaming service. In that case, the pre-defined rules may specify events such as each inning or changing picture. In such an example, the instructions may provide graphics such as an advertisement or ticker that represents the next streaming program after the baseball game. The pre-defined rules may further provide where and how the graphics can be inserted in the encoded video segments. For example, the pre-defined rules may specify a screen's location (or position) to overlay a graphic, where the encoded video segments are played on the screen. In another example, the pre-defined rules include various types of animations, and the client may use one of the animations to insert the graphics. In some embodiments, the client computing device 102 provides a search query. In these embodiments, the client may search a specific graphic or audio code and its associated pre-defined rules. For example, after the client inputs one or more search terms, the client computing device 102 may provide related data associated with the search terms. The client may use the results in performing the channel branding.

The instructions processing component 316 may further provide for the clients to personalize the secondary event data and the secondary event instructions. In some embodiments, the client computing device 102 may have its own assets in a library. The library includes graphics and/or audio codes that are not provided by the instructions included in the manifest. In these embodiments, the client may create its own personalized content by inserting one or more of those own assets. In some embodiments, the client may redefine the pre-defined rules, such as pre-defined time slots or events. This personalization aspect of the instructions processing component 316 is advantageous because the client can provide personalized content with various types of the secondary event data without re-encoding the original content. For example, conventionally, the graphics or audio code are inserted into the original content prior to the encoding into multiple segments, and the video content, including the graphics and audio codes, are encoded into the segments and stored on servers as "mezzanine" (or "master") assets. Conventionally, to personalize the encoded video segments, personalized secondary event data such as graphic and audio codes are needed to be inserted into the original content by utilizing the streaming service provider's resources. Thus, the original content is needed to be re-encoded with the personalized second content. In contrast, the embodiments of the present disclosure provide that the client computing device 102 downloads the encoded content segments and then inserts the secondary event data. Therefore, the client can personalize the secondary event data and the secondary event instructions without re-encoding the original content again.

In some embodiments, the client computing device 102 may generate synchronized content after inserting the secondary event data into the original content. The synchronized content can be utilized by the encoders, such as sequence numbers corresponding to the set of encoded segments, time stamp information related to a relative time of the encoded segments or from which relative time of encoded segments will be based, and the like.

The memory 310 may further include an encoded content processing component 318 to create linear over-the-top (OTT) channels. In some embodiments, content such as video is provided by the original content provider 130 of FIG. 1A, and the original contents are transcoded into multi-bitrate HTTP Live Streaming (HLS), Dynamic Adaptive Streaming over HTTP (DASH), or both formats. In such embodiments, the client computing device 102 may create a channel or program by combining one or more transcoded contents. In one embodiment, the client computing device 102 may have its own assets in a library such as a VOD library and use these assets to create the OTT channels.

Figure 4A:
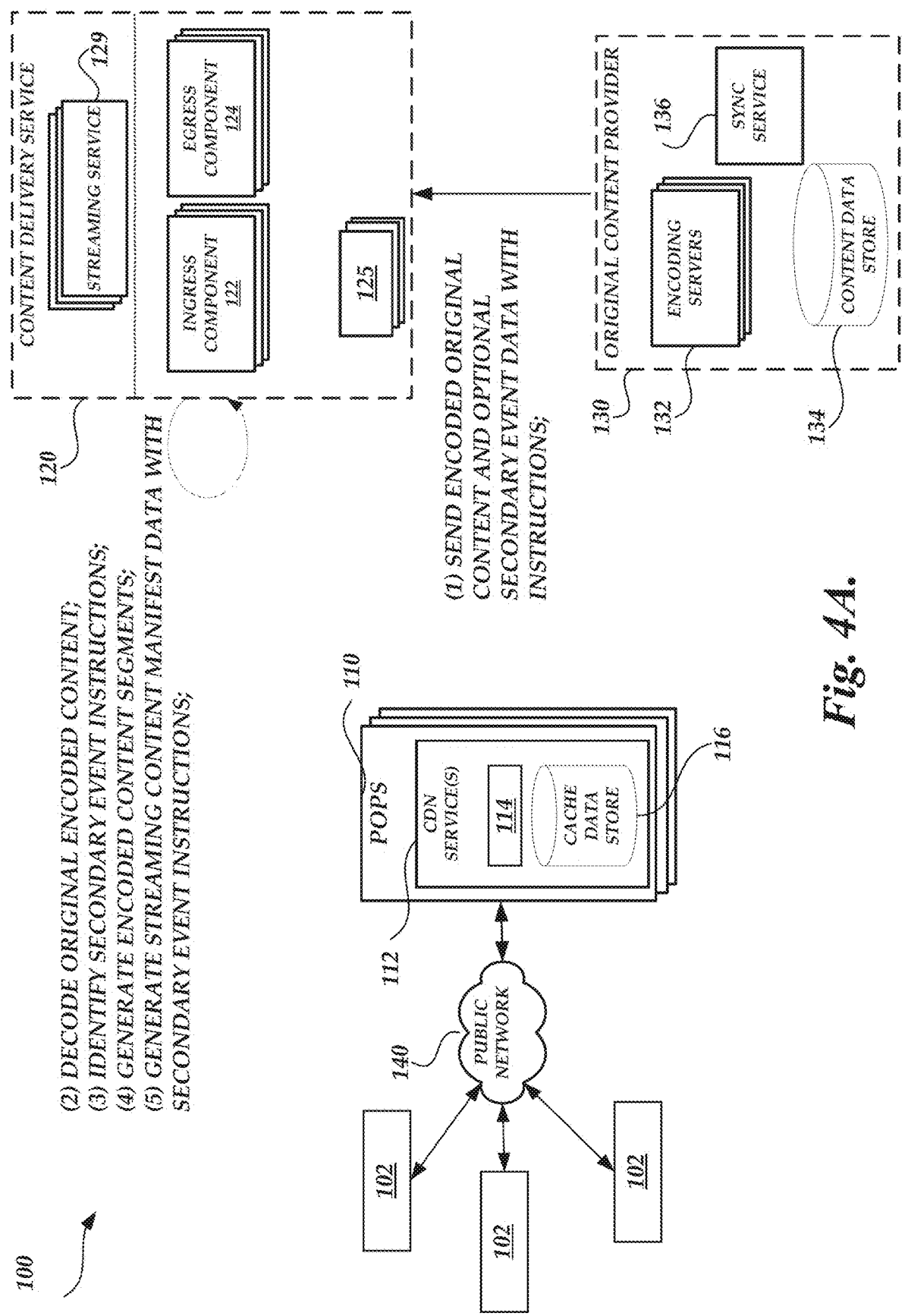
FIGS. 4A and 4B are block diagrams of the system FIG. 1A illustrating various instructions of providing instructions to the client computing device and processing of the instructions by the client computing device.
Figure 4B:
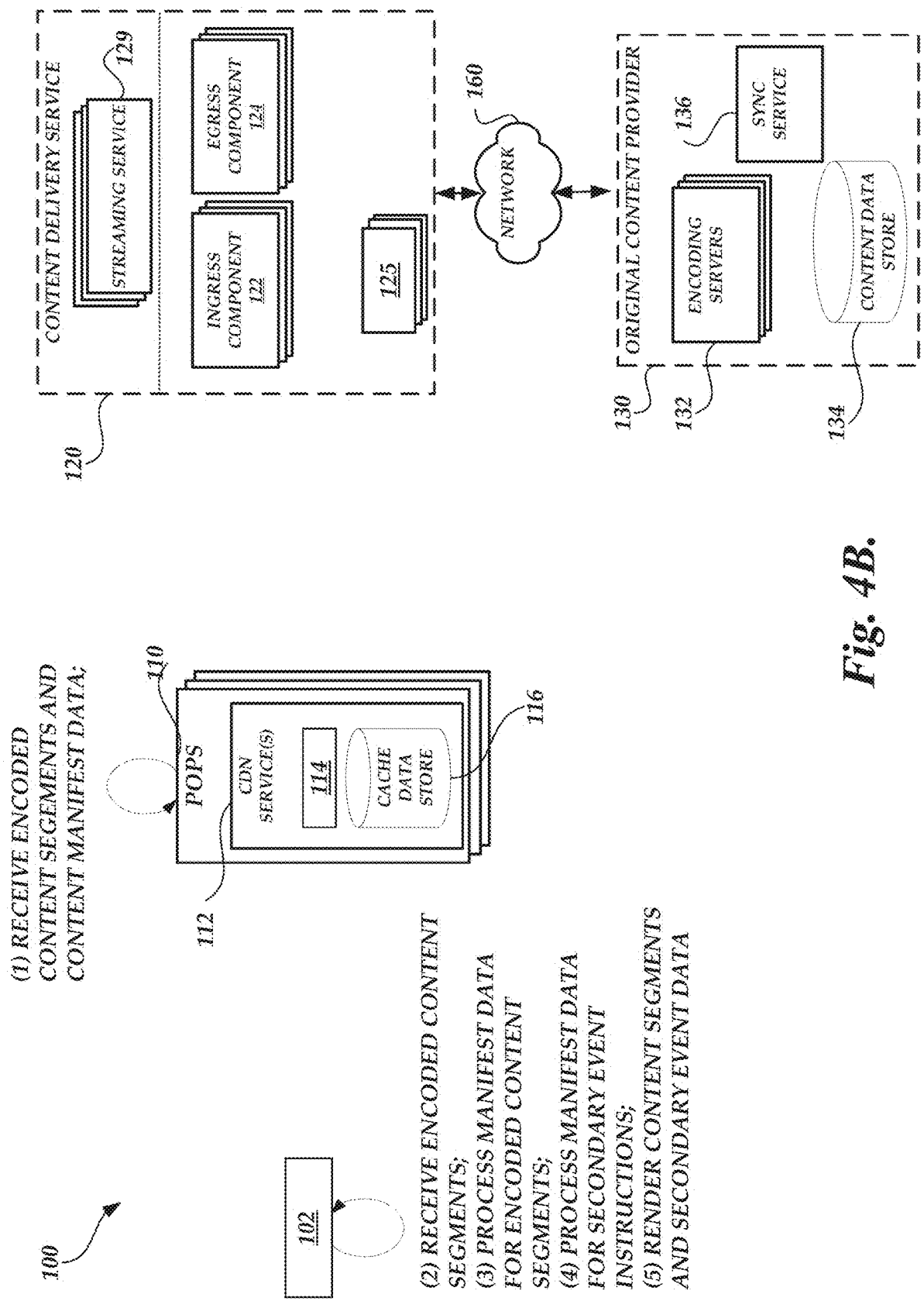

Turning now to FIGS. 4A and 4B, illustrative interactions of the components of the system 100 will be described. For purposes of the illustration, it can be assumed that a content delivery service 120 has been configured in a manner to implement a plurality of content streaming service 129 for the transmission of the encoded content to the client computing device 102 and ingress and egress components for encoding and decoding the original contents. The present disclosure is not intended to be limited to any particular type of service or the number of individual components that may be accessed or generate processing results as part of an execution of an application on behalf of clients. Furthermore, the present disclosure is not intended to limit the number of content streaming service configured to transmit encoded contents or ingress/egress components that are configured to decode or encode the original contents provided by an original content provider 130.

With reference to FIG. 4A, an illustrative interaction of providing instructions to the client computing device 102, will be described. Accordingly, the interaction is illustrative. At (1), an original content provider 130 can transmit original contents to a content delivery service 120. The original content can be stored in a content data store 134 and encoded by the encoding services 132 before transmitting to the content delivery service 120. In some embodiments, the original content includes secondary event data and secondary event instructions to be provided to client computing devices 102 for the client to process the original content by inserting the secondary event data based on the instructions. In some embodiments, the original content does not include the secondary event data and/or the secondary event instructions. In these embodiments, the client computing device 102 receives the secondary event data and/or the secondary event instructions from one or more external sources.

Further at (1), in some embodiments, the secondary event instructions may provide which one of the secondary event data such as graphics and audio codes are needed to be inserted into the original content; when these graphics or codes are needed to be inserted; where these graphics or codes are needed to be inserted; how the client can download or receive the graphics and audio watermarks; and what kinds of animations should be used. In these embodiments, the instructions may further provide sources of secondary event data. For example, using the client computing device 102, a client may download a graphic or audio code by accessing the provided sources, such as uniform resource locator (URL) addresses or one or more library addresses (server addresses) associated with each of the graphical images and audio codes. The instructions also may provide pre-defined rules, such as specific time slots or events in the channel, where one or more graphics or audio codes are inserted into each time slot or event. For example, the time slot can be defined between two sequential segments in original content, where the video file is transmitted to the client computing device 102 in the segment by segment, and each segment typically accounts for 2-10 seconds of playtime. In addition, where the client computing device receives a live streaming video, the pre-defined rule may provide specific events, where each event is associated with a specific graphic or audio code. For example, when the client computing device 102 is receiving a soccer game in a live streaming service, the pre-defined rules may provide that when the first half of the game is finished (such as that the referee is blowing a whistle to indicate the end of the first half of the game), a specific graphic is inserted into the live streaming channel. These are provided merely as examples, and the embodiments disclosed herein are not limited to these examples.

At (2), one or more ingress components (decoding nodes) can receive (directly or indirectly) original content from original content providers 130. In some embodiments, the original content is encoded in a bitrate/format representing a higher (or highest) quality that will eventually be transmitted to requesting users by the content delivery service 120. The decoding nodes 122 will decode the content and store the unencoded nodes in a memory, such as a cache 125 that is accessible to one or more encoding nodes 124. In a streaming embodiment, the decoding node continuously receives, decodes, and stores the original content. Additionally, the decoding nodes 122 can process multiple content streams from the same or different original content providers 130.

At (3), one or more content streaming services 129 may identify the secondary event instructions included in the original contents. The instruction can be provided as a file included in the originally encoded content segments or as a separate file from the original content segments. The instructions also may include secondary event datas such as graphics or audio files that can be used associated with the instructions. In some embodiments, the instructions are provided by external sources and transmitted to the client computing device with the associated original content.

Further at (3), for examples, the secondary event data includes graphical representation information, audio manipulation information, or various types of animation such as "snipes," "squeeze in," "fly-in and out," etc. The graphical representation information may include various types of graphics and their time slots where one or more graphics are inserted and screen position associated with each graphic's overlay. The audio manipulation information may include audio watermarks such as a Nielsen watermark including a Nielsen code. In addition, the secondary event instructions may provide the source of the graphical images, audio codes, and a list of animations that the client can select. For example, the instructions may provide a uniform resource locator (URL) or a library address (server address) associated with each of the graphical images and audio watermarks, and the client may select a graphic and insert it into the contents by using an animation provided in the instruction.

At (4), one or more egress components (encoding nodes) may encode the decoded original contents into a bitrate and format for delivery to the client computing devices 102. In some embodiments, the encoding nodes 124 encode the original content to be used in various communication protocols such as HTTP Live Streaming ("HLS"), Dynamic Adaptive Streaming over HTTP ("DASH"), HTTP Dynamic Streaming ("HDS"), Smooth Streaming, Real Time Messaging Protocol ("RTMP").

At (5), the content delivery service may generate streaming manifest content data with the instructions. In some embodiments, the streaming service 129 implemented in the content delivery service is configured to process the instructions to be included in manifest data. In some embodiments, the streaming service 129 may identify a communication protocol used in delivering the encoded original content segments to the client computing device 102. The communication protocol may include, for example, HLS, DASH, HDS, RTMP, and RTMP. These protocols are provided merely as examples, and other types of protocols can be used. After identifying the communication protocol used in delivering the encoded content segments, the content streaming service 129 may generate manifest data based on the identified communication protocol and overwrite the instructions into the manifest data. For example, in determining that the HLS streaming communication protocol is used to deliver the original content segments, the content streaming service 129 may generate a HLS manifest data and write the instructions on the manifest data. In one embodiment, where there is an existing manifest data, the streaming service 129 may add the instructions on the existing manifest data.

With reference to FIG. 4B, an illustrative interaction of processing of the instructions by the client computing device 102, will be described. Accordingly, the interaction is illustrative.

At (1), a CDN service provider 110 may receive the encoded content segments and the manifest data that include the secondary event instructions. In some embodiments, the CDN service provider 110 receives the secondary event data from the streaming service 129. The CDN service provider 110 may include multiple edge locations from which the client computing device 102 can retrieve the encoded content segments and the manifest data.

At (2), the client computing device 102 may request to receive encoded content segments. At (3), the client computing device 102 may process the manifest data for the encoded content segment requests. The manifest data may also include bit rate or resolution requirements to stream the encoded content segments.

At (4), the client computing device 102 may process the manifest data for the secondary event instructions. In some embodiments, the instructions provide which one of the secondary event data are needed to be inserted into the encoded content segments. In these embodiments, the instructions include a list of graphics and audio codes and their sources, such as uniform resource locator (URL) addresses or one or more library addresses (server addresses) associated with each of the graphical images and audio codes. For example, the instructions provide a graphic of a "news ticker" and the URL address to download the "news ticker." In another example, the instructions provide various Nielsen codes, where each Nielsen code can be used in a specific region. In such an example, the client may download the Nielsen code associated with a specific region where the client plans to provide the video streaming service. In some embodiments, the instructions include a pre-defined rule, such as time slots or events associated with graphic or audio code. For example, each segment of the encoded video segments may have a playtime of 10 seconds. In this example, if the total playtime of the encoded video segments is 1 hour, there are 360 time slots. In one embodiment, where the client is providing a live streaming service using the encoded video segments, the pre-defined rules may provide events where each event is associated with a specific graphic or audio code. For example, suppose the encoded video is a live baseball game provided in a live streaming service. In that case, the pre-defined rules may specify events such as each inning or changing picture. For example, the instructions may provide graphics such as advertisements or a ticker representing the next streaming program after the baseball game. The pre-defined rules may further provide where and how the graphics can be inserted in the encoded video segments. For example, the pre-defined rules may specify a screen's location (or position) to overlay a graphic, where the encoded video segments are played on the screen. In another example, the pre-defined rules include various types of animations, and the client may use one of the animations to insert the graphics. In some embodiments, the instructions may provide a piece of synchronization information. For example, after inserting one or more of the secondary event data into the original content segments, the original content segments can be synchronized based on the instructions. (i.e., after inserting one or more of the secondary event data into the original content segments, the timing information of the original segments is synchronized).

Further at (4), the computing device 102 also can personalize the instructions. In some embodiments, the client computing device 102 may have its own assets (i.e., own secondary event data) in a library, such as internal, external, cloud-based storage. The library may include personalized secondary event data such as graphics and/or audio codes that are not included in the manifest. In these embodiments, the client may create its own personalized content by inserting the personalized secondary event data into the original content. In some embodiments, the client may redefine the pre-defined rules, such as pre-defined time slots or events. In one embodiment, the client may further personalize the secondary event instructions to create personalized content.

At (5), the client computing device 102 may provide the streaming service to its viewers.

Figure 5:
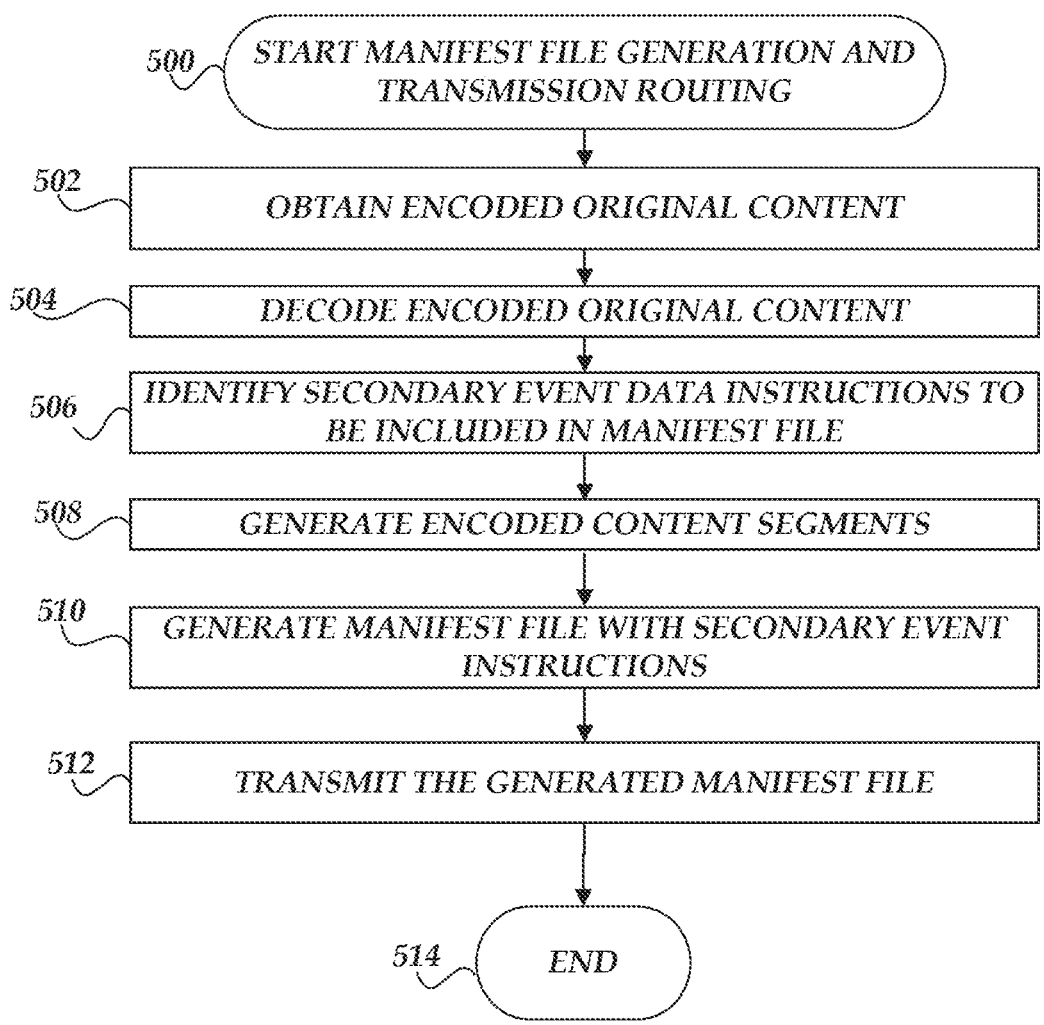
FIG. 5 is a flow diagram illustrative of a routine for the manifest data generation and transmission.

Turning now to FIG. 5, a routine 500 for the manifest data generation and transmission will be described. The manifest data may include the instructions as described in this disclosure. Routing 500 is illustratively implemented by the content delivery service 120.

At block 502, the content delivery service 120 obtains encoded original content provided by the original content provider 130. In some embodiments, the original content provider 130 can transmit original contents to a content delivery service 120. The original content can be stored in a content data store 134 and encoded by the encoding services 132 before transmitting to the content delivery service 120. In some embodiments, the original content includes secondary event data and secondary event instructions to be provided to client computing devices 102 for the client to process the original content by inserting the secondary event data based on the instructions. In some embodiments, the original content does not include the secondary event data and/or the secondary event instructions. In these embodiments, the client computing device 102 receives the secondary event data and/or the secondary event instructions from one or more external sources.

In some embodiments, the secondary event instructions may provide which one of the secondary event data, such as graphics and audio codes, are needed to be inserted into the original content; when these graphics or codes are needed to be inserted; where these graphics or codes are needed to be inserted; how the client can download or receive the graphics and audio watermarks; and what kinds of animations should be used. In these embodiments, the instructions may further provide sources of secondary event data. For example, using the client computing device 102, a client may download a graphic or audio code by accessing the provided sources, such as uniform resource locator (URL) addresses or one or more library addresses (server addresses) associated with each of the graphical images and audio codes. The instructions also may provide pre-defined rules, such as specific time slots or events in the channel, where one or more graphics or audio codes are inserted into each time slot or event. For example, the time slot can be defined between two sequential segments in original content, where the video file is transmitted to the client computing device 102 in the segment by segment, and each segment typically accounts for 2-10 seconds of playtime. In addition, where the client computing device receives a live streaming video, the pre-defined rule may provide specific events, where each event is associated with a specific graphic or audio code. For example, when the client computing device 102 is receiving a soccer game in a live streaming service, the pre-defined rules may provide that when the first half of the game is finished (such as that the referee is blowing a whistle to indicate the end of the first half of the game), a specific graphic is inserted into the live streaming channel. These are provided merely as examples, and the embodiments disclosed herein are not limited to these examples.

At block 504, one or more ingress components (decoding nodes) implemented in the content delivery service 120 can receive (directly or indirectly) original content from original content providers 130. In some embodiments, the original content is encoded in a bitrate/format representing a higher (or highest) quality that will eventually be transmitted to requesting users by the content delivery service 120. The decoding nodes 122 will decode the content and store the unencoded nodes in a memory, such as a cache 125, which is accessible to one or more encoding nodes 124. In a streaming embodiment, the decoding node continuously receives, decodes and stores the original content. Additionally, the decoding nodes 122 can process multiple content streams from the same or different original content providers 130.

At block 506, one or more content streaming service 129 implemented in the content delivery service 120 may identify instructions included in the original contents. The instruction can be provided as a file included in the originally encoded content segments or as a separate file from the original content segments. The instructions also may include secondary event datas such as graphics or audio files that can be used associated with the instructions. In some embodiments, the instructions are provided by external sources and transmitted to the client computing device with the associated original content.

At block 508, the content delivery service 120 may generate encoded content segments for delivery to the client computing device 102. In some embodiments, the encoding nodes 124 encode the original content to be used in various communication protocols such as HTTP Live Streaming ("HLS"), Dynamic Adaptive Streaming over HTTP ("DASH"), HTTP Dynamic Streaming ("HDS"), Smooth Streaming, Real Time Messaging Protocol ("RTMP").

At block 510, the content delivery service 120 may generate manifest data with the secondary event instructions. In some embodiments, the streaming service 129 implemented in the content delivery service is configured to process the instructions to be included in manifest data. In some embodiments, the streaming service 129 may identify a communication protocol used in delivering the encoded original content segments to the client computing device 102. The communication protocol may include, for example, HLS, DASH, HDS, RTMP, and RTMP. These protocols are provided merely as examples, and other types of protocols can be used. After identifying the communication protocol used in delivering the encoded content segments, the streaming service 129 may generate manifest data based on the identified communication protocol and overwrite the instructions into the manifest data. For example, in determining that the HLS streaming communication protocol is used to deliver the original content segments, the streaming service 129 may generate a HLS manifest data and write the instructions on the manifest data. In one embodiment, where there is an existing manifest data, streaming service 129 may add the instructions on the existing manifest data.

At block 512, the content delivery service 120 may transmit the encoded content segments and the manifest data to a CDN service provider 110. Then, the routine 500 can be ended at block 514.

Figure 6:
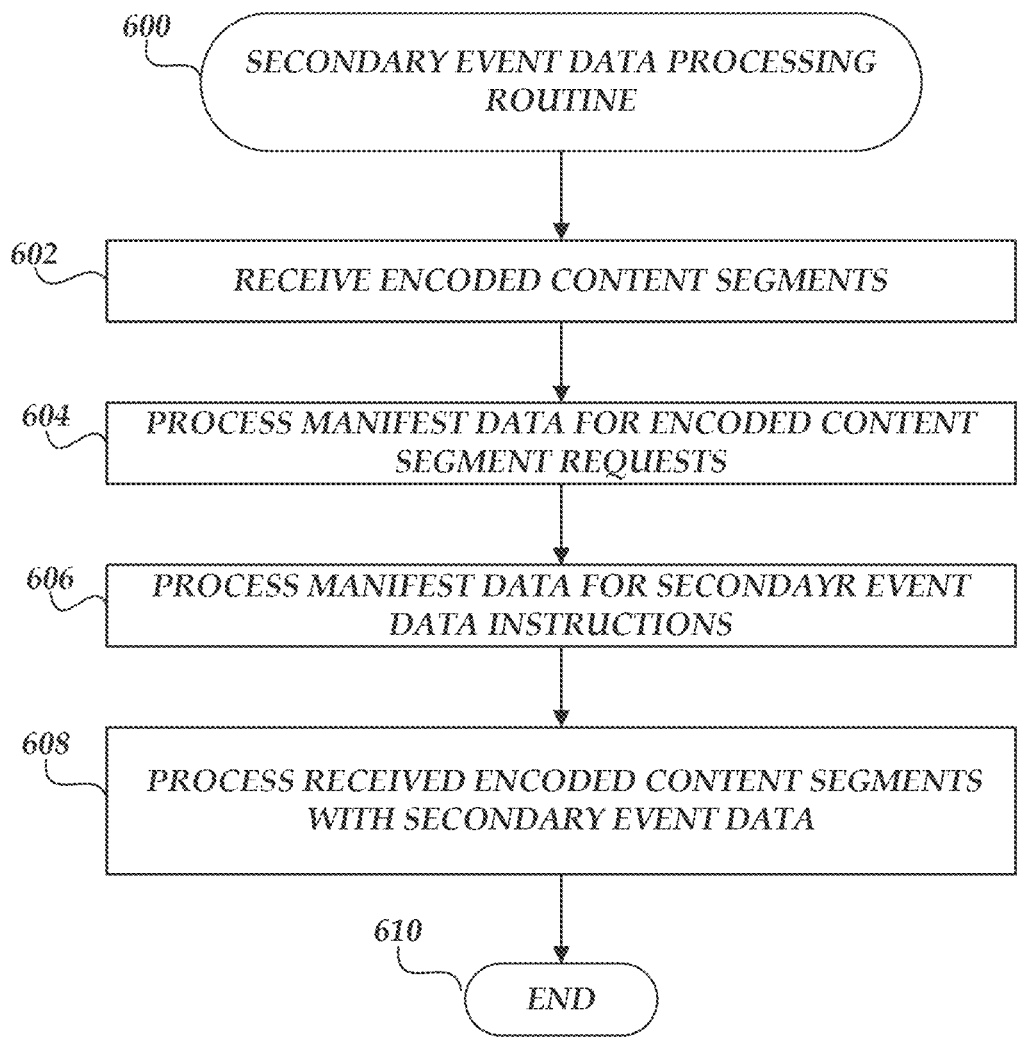
FIG. 6 is a flow diagram illustrative of a routine of the client computing device for processing secondary event data to insert into an original content based on secondary event instructions in manifest data.

Turning now to FIG. 6, a routine 600 for the channel branding using the client computing device 102 will be described. Routing 600 is illustratively implemented by the client computing device 102.

At block 602, the client computing device 102 may request to receive encoded content segments. At block 604, the client computing device 102 may process the manifest data for the encoded content segment requests.

At block 606, the client computing device 102 may process the manifest data for the instructions. In some embodiments, the instructions provide what graphics and audio codes need to be inserted in the encoded content manifest data. In these embodiments, the instructions include a list of graphics and audio codes and their sources, such as uniform resource locator (URL) addresses or one or more library addresses (server addresses) associated with each of the graphical images and audio codes. For example, the instructions provide a graphic of a "news ticker" and the URL address to download the "news ticker." In another example, the instructions provide various Nielsen codes, where each Nielsen code can be used in a specific region. In such an example, the client may download the Nielsen code associated with a specific region where the client plans to provide the video streaming service. In some embodiments, the instructions include a pre-defined rule, such as time slots or events associated with graphic or audio code. For example, each segment of the encoded video segments may have a playtime of 10 seconds. In this example, if the total playtime of the encoded video segments is 1 hour, there are 360 time slots. In one embodiment, where the client is providing a live streaming service using the encoded video segments, the pre-defined rules may provide events where each event is associated with a specific graphic or audio code. For example, suppose the encoded video is a live baseball game provided in a live streaming service. In that case, the pre-defined rules may specify events such as each inning or changing picture. In such an example, the instructions may provide graphics such as an advertisement or ticker that represents the next streaming program after the baseball game. The pre-defined rules may further provide where and how the graphics can be inserted in the encoded video segments. For example, the pre-defined rules may specify a screen's location (or position) to overlay a graphic, where the encoded video segments are played on the screen. In another example, the pre-defined rules include various types of animations, and the client may use one of the animations to insert the graphics. In some embodiments, the instructions may provide synchronization information. For example, after inserting one or more of the secondary event data into the original content segments, the original content segments can be synchronized based on the instructions. (i.e., after inserting one or more of the secondary event data into the original content segments, the timing information of the original segments is synchronized).

Further, at block 606, the computing device 102 also can personalize the instructions. In some embodiments, the client computing device 102 may have its own assets (i.e., own secondary event data) in a library, such as internal, external, cloud based storage. The library may include personalized secondary event data such as graphics and/or audio codes that are not included in the manifest. In these embodiments, the client may create its own personalized content by inserting the personalized secondary event data into the original content. In some embodiments, the client may redefine the pre-defined rules, such as pre-defined time slots or events. In one embodiment, the client may further personalize the secondary event instructions to create personalized content.

At block 608, the client computing device 102 may process the encoded content segments and provide the streaming service to its viewers. In some embodiments, the synchronized content is provided to the viewers. After providing the streaming service and/or synchronized content to the viewers, the routine 600 can be ended at block 610.

Alternative Embodiment

The present disclosure is not limited to the embodiments as disclosed above. Various alternative embodiments can be used in some aspects of the present disclosure. For example, in one alternative embodiment, a hybrid client-side secondary event data rendering system can insert the second content into the original content by utilizing both the client computing device and streaming service provider resources (i.e., network computing device resources such as CPUs, GPUs, or servers). Illustratively, some tasks of the processing the original content by inserting the secondary event data can be performed by utilizing the streaming service provider's resources such as servers, GPUs, and CPUs, and the other tasks of the channel branding can be performed by utilizing the client computing devices as disclosed herein. For example, one or more graphics may be inserted into the original content, and the original content with the graphic can be encoded into encoded content segments. In this example, the client may also receive manifest data, including the secondary event instruction for processing the original content by inserting the secondary event data. In addition, the client also may process the original content by utilizing personalized secondary event data and/or the secondary event instructions disclosed in one or more embodiments of the present disclosure.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be fully automated via software code modules, including one or more specific computer-executable instructions executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of external computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable external computing device, a device controller, or a computational engine within an appliance, to be name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code that include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system to generating content comprising:
one or more computing processors and memories associated with a content streaming service, wherein the content streaming service is configured to:
obtain, from original content provider computing devices, input content, wherein the input content is encoded;
decode, at a decode node of the content streaming service, the encoded input content, wherein the decode node continuously receives the encoded input content from the original content provider computing devices;
encode the decoded input content into a set of encoded content segments, wherein the set of encoded content segments is distributed to one or more client computing devices;
identify a streaming protocol associated with the set of encoded content segments;
generate a manifest data corresponding to the identified streaming protocol, the manifest data associated with the set of encoded content segments and including one or more secondary event instructions; and
transmit, responsive to requests for content from client computing devices, the generated manifest data;
one or more computing processors and memories associated with client computing device, wherein individual client computing devices are configured to:
transmit request for streaming content to the content streaming service;
receive the generated manifest data responsive of the transmitted request for streaming content;
process the received manifest data to identify the set of encoded content segments and identify the one or more secondary event instructions, wherein the one or more secondary event instructions include at least address information associated with secondary event data, the secondary event data corresponding to each of the one or more secondary event instructions;
obtain the identified set of encoded content segments and the secondary event data; and
cause rendering of the set of encoded content segments with the secondary event data based on the one or more secondary event instructions.

2. The system of claim 1, wherein the address information included in the one or more secondary event instructions provided in the manifest include instructions identifying at least one of an identifier or network location for the secondary event data, and wherein the identifier or the network location corresponds to uniform resource locator (URL) addresses or one or more library addresses (server address) associated with the secondary event data.

3. The system of claim 1, wherein the one or more secondary event instructions provided in the manifest include instructions identifying timing information related to the rendering of the secondary event data.

4. The system of claim 1, wherein the one or more secondary event instructions provided in the manifest include instructions regarding placement of the secondary event data relative to rendering of the encoded content.

5. The system of claim 1, the streaming protocol includes at least one of a multi-bitrate HTTP Live Streaming (HLS) protocol or a Dynamic Adaptive Streaming over HTTP (DASH) protocol.

6. A system for content streaming comprising:
one or more computing processors and memories associated with a content streaming service, wherein the content streaming service is configured to:
obtain, from original content provider computing devices, an input content, wherein the input content is encoded;
identify a streaming protocol associated with the set of encoded content segments; and
generate a manifest data according to the identified streaming protocol, the manifest data including secondary event instructions, wherein the secondary event instructions include at least address information associated with secondary event data, the secondary event data corresponding to each of the one or more secondary event instructions; and
one or more computing processors and memories associated with one or more client computing devices, wherein each of the client computing device is configured to:
transmit requests for streaming content to the content streaming service;
receive the generated manifest data responsive of the transmitted request for streaming content; and
cause rendering of set of encoded content segments with the secondary event data based on the secondary event instructions included in the received manifest data.

7. The system of claim 6, wherein the address information included in the secondary event instructions provided in the manifest include instructions identifying at least one of an identifier or network location for the secondary event data, and wherein the identifier or the network location corresponds to uniform resource locator (URL) addresses or one or more library addresses (server address) associated with the secondary event data.

8. The system of claim 6, wherein the secondary event instructions provided in the manifest include instructions identifying timing information related to the rendering of the secondary event data.

9. The system of claim 8, wherein the timing information includes timing information relative to a start time associated with the encoded content segments.

10. The system of claim 6, wherein the secondary event instructions provided in the manifest include instructions regarding placement of the secondary event data relative to rendering of the encoded content.

11. The system of claim 6, the streaming protocol includes at least one of a multi-bitrate HTTP Live Streaming (HLS) protocol or a Dynamic Adaptive Streaming over HTTP (DASH) protocol.

12. The system of claim 6, wherein the secondary event instructions provided in the manifest include one or more pre-defined rules, wherein the one or more pre-defined rules provide criteria to determine at least one of a selection of a supplemental content to be rendered or timing of rendering secondary event data.

13. The system of claim 6, wherein each client device is further configured to process the received manifest data to identify the set of encoded content segments and identify the secondary event instructions.

14. The system of claim 6, wherein the streaming service is further operable to:

decode, at a decode node implemented in the content streaming service, the encoded input content, wherein the decode node continuously receives the encoded input content from the original content provider computing devices; and
encode the decoded input content into a set of encoded content segments, wherein the set of encoded content segments are distributed to one or more client computing devices.

15. A computer-implemented method for content delivery comprising:
transmitting request for streaming content to a content streaming service;
receiving, from the content streaming service, manifest data responsive of the transmitted request for streaming content, wherein the content streaming service is configured to:
identify streaming protocol corresponding to the requested streaming content; and
generate the manifest data according to the identified streaming protocol, wherein the manifest data includes one or more secondary event instructions, and wherein the one or more secondary event instructions include at least address information associated with secondary event data, the secondary event data corresponding to each of the one or more secondary event instructions;
processing the received manifest data to identify a set of encoded content segments and identify the one or more secondary event instructions;
obtaining the identified set of the encoded content segments and the one or more secondary event instructions; and
causing rendering of the set of encoded content segments with the secondary event data based on the secondary event instructions.

16. The computer-implemented method of claim 15, wherein the address information included in the one or more secondary event instructions provided in the manifest data include instructions identifying at least one of an identifier or network location for the secondary event data, and wherein the identifier or the network location corresponds to uniform resource locator (URL) addresses or one or more library addresses (server address) associated with the secondary event data.

17. The computer-implemented method of claim 15, wherein the one or more secondary event instructions provided in the manifest include instructions identifying timing information related to the rendering of the secondary event data.

18. The computer-implemented method of claim 15, wherein the one or more secondary event instructions provided in the manifest include instructions regarding placement of the secondary event data relative to rendering of the encoded content.

19. The computer-implemented method of claim 15, wherein the secondary event instructions provided in the manifest include one or more pre-defined rules, wherein the one or more pre-defined rules provide criteria to determine at least one of a selection of a supplemental content to be rendered or timing of rendering the secondary event data.

20. The computer-implemented method of claim 15, wherein the one or more secondary event instructions provided in the manifest include one or more pre-defined rules, wherein the one or more pre-defined rules provide criteria to determine at least one of a selection of the secondary event data to be rendered or timing of rendering a supplemental content.

21. The computer-implemented method of claim 15, wherein the one or more secondary event instructions provided in the manifest include one or more processing rules, wherein the processing rules provide type of an audio code.

22. The computer-implemented method of claim 15 further comprising synchronizing the rendered set of encoded content segments with the secondary event data based on the one or more secondary event instructions.

23. The computer-implemented method of claim 15, further comprising processing the received manifest data to identify the set of encoded content segments and identify the one or more secondary event instructions.

* * * * *